United States Patent
Zhou et al.

(10) Patent No.: US 10,747,987 B2
(45) Date of Patent: Aug. 18, 2020

(54) ELECTRONIC DEVICE AND METHOD FOR RECOGNIZING REAL FACE AND STORAGE MEDIUM

(71) Applicant: GUANGDONG OPPO MOBILE TELECOMMUNICATIONS CORP., LTD., Dongguan, Guangdong (CN)

(72) Inventors: Haitao Zhou, Dongguan (CN); Yibao Zhou, Dongguan (CN); Cheng Tang, Dongguan (CN); Xueyong Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 119 days.

(21) Appl. No.: 16/040,379

(22) Filed: Jul. 19, 2018

(65) Prior Publication Data
US 2019/0026539 A1    Jan. 24, 2019

(30) Foreign Application Priority Data
Jul. 20, 2017    (CN) .......................... 2017 1 0597769

(51) Int. Cl.
*G06K 9/00*    (2006.01)
*G06K 9/22*    (2006.01)
(Continued)

(52) U.S. Cl.
CPC ..... *G06K 9/00261* (2013.01); *G06K 9/00255* (2013.01); *G06K 9/00899* (2013.01);
(Continued)

(58) Field of Classification Search
CPC .. G06K 9/00261; G06K 9/22; G06K 9/00255; G06K 9/00899; G06K 9/6215;
(Continued)

(56) References Cited

U.S. PATENT DOCUMENTS

| 8,306,283 B2 | 11/2012 | Zhang |
| 2010/0104195 A1 | 4/2010 | Lin |

(Continued)

FOREIGN PATENT DOCUMENTS

| CN | 102694976 A | 9/2012 |
| CN | 103685905 A | 3/2014 |

(Continued)

OTHER PUBLICATIONS

International Search Report in international application No. PCT/CN2018/096315, dated Oct. 25, 2018.
(Continued)

*Primary Examiner* — Christopher M Brandt
(74) *Attorney, Agent, or Firm* — Ladas & Parry, LLP

(57) ABSTRACT

An electronic device and method for recognizing a real face are provided. The electronic device includes a face image acquisition device and a processor connected to the face image acquisition device. The face image acquisition device is configured to acquire a plurality of face images of a face at a plurality of focal lengths within a first focal length range. The plurality of face images correspond to a plurality of focus planes respectively. The processor is configured to determine at least one face images with a higher definition out of the plurality of the face images, and form a second focal length range with focal lengths of the at least one face images. The processor is further configured to determine that the face is a real face according to the second focal length range.

17 Claims, 7 Drawing Sheets

(51) Int. Cl.
*G06T 7/136* (2017.01)
*G06T 7/11* (2017.01)
*G06T 7/70* (2017.01)
*G06K 9/62* (2006.01)
*G06T 7/00* (2017.01)

(52) U.S. Cl.
CPC ............ *G06K 9/22* (2013.01); *G06K 9/6215* (2013.01); *G06T 7/0016* (2013.01); *G06T 7/11* (2017.01); *G06T 7/136* (2017.01); *G06T 7/70* (2017.01); *G06T 2207/30201* (2013.01)

(58) Field of Classification Search
CPC ............ G06K 9/00221; G06K 9/00906; G06T 7/136; G06T 7/11; G06T 7/70; G06T 7/0016; G06T 2207/30201; G06F 21/32
See application file for complete search history.

(56) References Cited

U.S. PATENT DOCUMENTS

| | | |
|---|---|---|
| 2010/0188504 A1 | 7/2010 | Dimsdale |
| 2010/0266207 A1 | 10/2010 | Zhang |
| 2014/0132749 A1* | 5/2014 | Hartman ............ G06K 9/00604 348/78 |
| 2016/0063235 A1 | 3/2016 | Tussy |
| 2016/0188860 A1* | 6/2016 | Lee ............ G06F 21/32 726/18 |
| 2017/0347015 A1* | 11/2017 | Pan ............ H04N 5/23212 |
| 2018/0218139 A1 | 8/2018 | Tussy |
| 2018/0285668 A1* | 10/2018 | Li ............ G06K 9/00899 |
| 2019/0213316 A1 | 7/2019 | Tussy |

FOREIGN PATENT DOCUMENTS

| | | |
|---|---|---|
| CN | 105389491 A | 3/2016 |
| CN | 105740779 A | 7/2016 |
| CN | 106412422 A | 2/2017 |
| CN | 106412437 A | 2/2017 |
| CN | 107480601 A | 12/2017 |
| DE | 10201407160 A1 | 1/2015 |
| EP | 2993619 A1 | 3/2016 |

OTHER PUBLICATIONS

Written Opinion of the International Search Authority in international application No. PCT/CN2018/096315, dated Oct. 25, 2018.
Supplementary European Search Report in European application No. 18184351.7, dated Nov. 27, 2018.
First Office Action of the Chinese application No. 201710597769.X, dated Jun. 6, 2019.

* cited by examiner

ELECTRONIC DEVICE AND METHOD FOR RECOGNIZING REAL FACE AND STORAGE MEDIUM

CROSS-REFERENCE TO RELATED APPLICATION

The present application claims benefit of Chinese Patent Application 201710597769.X, filed on Jul. 20, 2017, the contents of which are hereby incorporated by reference in its entirety.

TECHNICAL FIELD

The present disclosure relates to the technical field of electronic devices, and more particularly to an electronic device and method for recognizing real face and storage medium.

BACKGROUND

Along with wide popularization and application of smart phones, a smart phone may support more and more applications and has more and more powerful functions. Smart phones are developed towards a diversification and personalization direction and become indispensable electronic products in lives of users.

Typically, a biological information unlocking solution is adopted for most of smart phones, for example, face unlocking and iris unlocking. Security of the smart phones is improved.

SUMMARY

Embodiments of the disclosure provide an electronic device and method for recognizing real face and storage medium.

According to a first aspect, an electronic device for recognizing a real face is provided. The electronic device includes a face image acquisition device and a processor connected to the face image acquisition device. The face image acquisition device is configured to acquire a plurality of face images of a face at a plurality of focal lengths within a first focal length range. The plurality of face images correspond to a plurality of focus planes respectively. The processor is configured to determine at least one face images with a higher definition out of the plurality of the face images, and form a second focal length range with focal lengths of the at least one face images. The processor is further configured to determine that the face is a real face according to the second focal length range.

According to a second aspect, a method for recognizing a real face is provided. The method includes the following actions. An electronic device acquires a plurality of face images of a face at a plurality of focal lengths within a first focal length range. The plurality of face images corresponds to a plurality of focus planes respectively. The electronic device determines at least one face images with a higher definition out of the plurality of the face images, and forms a second focal length range with focal lengths of the at least one face images. The electronic device determines that the face is a real face according to the second focal length range.

According to a third aspect, the embodiments of the disclosure provide a non-transitory computer-readable storage medium, where the computer-readable storage medium may store a computer program configured for exchanging electronic data, where the computer program may enable a computer to execute part or all of actions described in any method of the second aspect of the embodiments of the disclosure, and the computer may include an electronic device.

BRIEF DESCRIPTION OF DRAWINGS

In order to describe the technical solutions of the embodiments of the disclosure or a conventional art more clearly, the drawings required to be used in descriptions about the embodiments or the conventional art will be simply introduced below. Obviously, the drawings described below are only some embodiments of the disclosure. Other drawings may further be obtained by those of ordinary skilled in the art according to these drawings without creative work.

DETAILED DESCRIPTION

For making the solutions of the disclosure better understood by those skilled in the art, the technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those of ordinary skilled in the art on the basis of the embodiments in the disclosure without creative work shall fall within the scope of protection of the disclosure.

Terms "first", "second" and the like in the specification, claims and drawings of the disclosure are adopted not to describe a specific sequence but to distinguish different objects. In addition, terms "include" and "have" and any transformation thereof are intended to cover nonexclusive inclusions. For example, a process, method, system, product or equipment including a series of actions or units is not limited to the actions or units which are listed, but may further include actions or units which are not listed or may further includes other actions or units intrinsic to the process, the method, the product or the equipment.

"Embodiment" mentioned in the disclosure means that a specific characteristic, structure or feature described in combination with the embodiment may be included in at least one embodiment of the disclosure. The phrase appearing at each position in the specification does not always refer to the same embodiment as well as an independent or alternate embodiment mutually exclusive with the other embodiments. Those skilled in the art explicitly and implicitly understand that the embodiments described in the disclosure may be combined with the other embodiments.

An electronic device involved in the embodiments of the disclosure may include various kinds of handheld equipment with a wireless communication function, vehicle-mounted equipment, wearable equipment, computing equipment or other processing equipment connected to a wireless modem and various forms of User Equipment (UE), Mobile Stations (MSs), terminal devices and the like. For convenient description, the equipment mentioned above is collectively referred to as electronic device.

The electronic device described in the embodiments of the disclosure is provided with a biological image acquisition device, and the biological image acquisition device specifically includes an iris image acquisition device and a face image acquisition device, where the iris image acquisition device may include an infrared light source and an iris camera, the infrared light source is configured to emit infrared light to irradiate an iris of a user to form reflected light, and the iris camera is configured to acquire the reflected light to form an iris image. The face image acquisition device may be a generic general camera module, for example, a front camera. The embodiments of the disclosure will be described below in detail.

Figure 1:
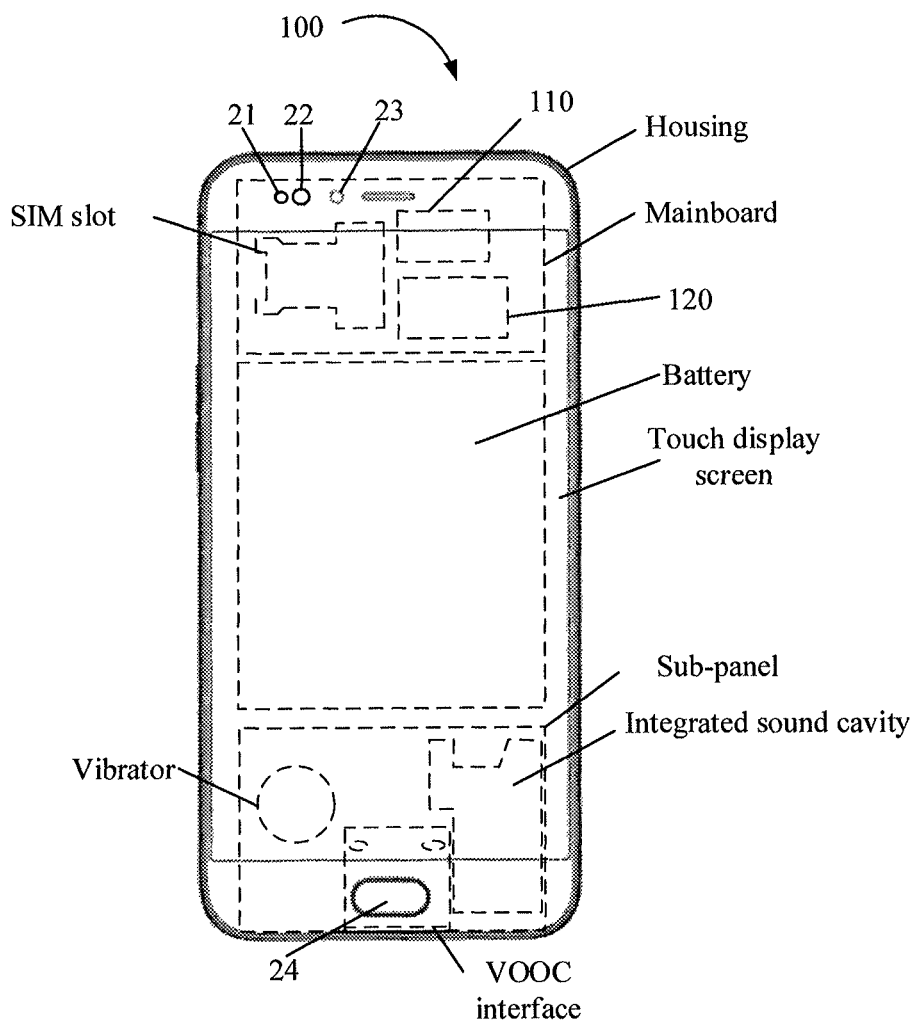
FIG. 1 illustrates a structure diagram of an electronic device according to an embodiment of the disclosure.

FIG. 1 is a structure diagram of an electronic device 100 according to an embodiment of the disclosure. The electronic device is a first electronic device, and for example, is a mobile terminal. The electronic device 100 includes: a housing, a touch display screen, a mainboard, a battery and a sub-pane. An infrared light source 21, an iris camera 22, a front camera 23, a processor 110, a memory 120, a Subscriber Identity Module (SIM) slot and the like are arranged on the mainboard. A vibrator, an integrated sound cavity, a VOOC interface and a fingerprint module 24 are arranged on the sub-panel. The infrared light source 21 and the iris camera 22 form an iris information acquisition device of the electronic device 100. The front camera 23 forms a face information acquisition device of the electronic device 100. The fingerprint sensor 24 module forms a fingerprint information acquisition device of the electronic device 100.

The face image acquisition device 23 is configured to, when a focal length is consecutively changed in a first focal length distance, consecutively acquire multiple face images.

The processor 110 is configured to determine a second focal length range according to definitions of the multiple face images.

The processor 110 is further configured to determine that a face is a real face according to the second focal length range.

It can be seen that, in the embodiment of the disclosure, the electronic device consecutively acquires the multiple face images at first when the focal length is consecutively changed in the first focal length range. Then the electronic device determines the second focal length range according to the definitions of the multiple face images and finally determines that a user is a real user according to the second focal length range. Apparently, the electronic device determines the second focal length range capable of making a face image sharp according to the definitions of the multiple face images acquired under different focal lengths and determines that the face is not an unreal face such as a photo but a real 3D face according to the second focal length range. Therefore, improvement of security of the electronic device is facilitated. Moreover, the real face may be judged only by acquiring the face images, and no additional hardware for cooperation is required. Thus, improvement of detection convenience is facilitated.

In a possible example, before the face image acquisition device 23 consecutively acquires the multiple face images when the focal length is consecutively changed in the first focal length range, the processor 110 is further configured to determine a distance parameter value between the face and the display screen. The processor 110 is configured to look up a mapping relationship between preset distance parameter values and focal length ranges according to the distance parameter value, to determine the first focal length range correspond to the distance parameter value.

In a possible example, before the face image acquisition device consecutively acquires the multiple face images when the focal length is consecutively changed in the first focal length range, the processor 110 is further configured to determine the distance parameter value between the face and the display screen. The processor 110 is further configured to determine a reference focus according to the distance parameter value. The processor 110 is further configured to acquire a reference face image according to the reference focus. The processor 110 further is configured to, when it is determined that a definition of the reference face image is higher than a first preset threshold value, determine the first focal length range according to the reference focus and a preset range.

In a possible example, in terms of determination about the second focal length range according to the definitions of the multiple face images, the processor 110 is configured to judge whether a region of which a definition is higher than a second preset threshold value exists in each of the multiple face images. The processor 110 is further configured to, when it is determined that the region of which the definition is higher than the preset threshold value exists in at least one of the multiple face images, acquire a focal length corresponding to the at least one face image. The processor 110 is further configured to determine the second focal length range according to the acquired focal length.

In a possible example, in terms of determination about that the face is the real face according to the second focal length range, the processor 110 is configured to judge whether the second focal length range is larger than a preset range. The processor 110 is further configured to, when it is determined that the second focal length range is larger than or equal to the preset range, determine that the face is the real face.

Figure 2A:
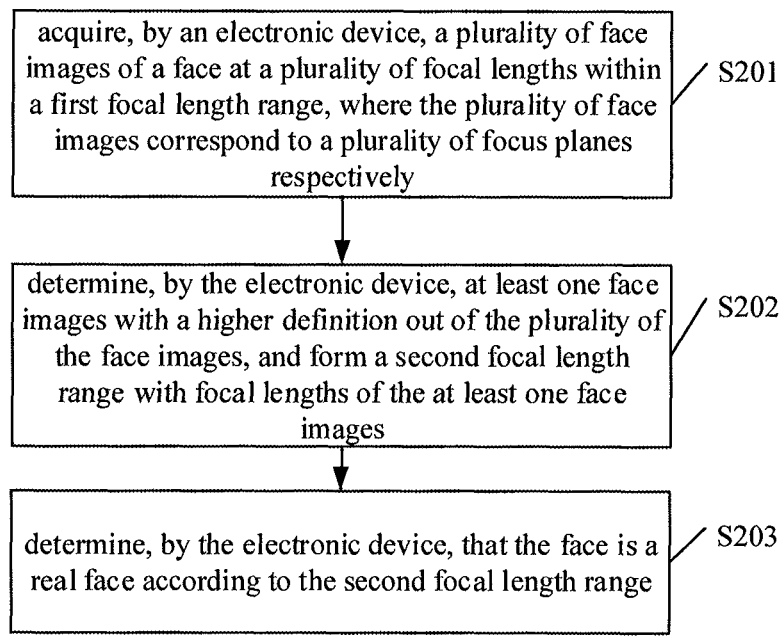
FIG. 2A illustrates a flowchart of a method according to an embodiment of the disclosure.

FIG. 2A is a flowchart of a method according to an embodiment of the disclosure. The method is applied to an electronic device, and as illustrated in the figure, includes the following actions illustrated in blocks. The method may start at block S201.

At block S201, when a focal length is consecutively changed in a first focal length range, the electronic device consecutively acquires multiple face images.

The multiple face images are multiple face images under different focal lengths, and the multiple face images are acquired at the same time when the focal length changes in the first focal length range.

A manner in which the focal length is consecutively changed in the first focal length range may be set by a system and may also be an appropriate manner learned by the electronic device through big data in a historical using process, which is not limited herein. For example, the focal length may gradually change in the first focal length range and may also consecutively change in the first focal length range according to a certain zooming ratio.

Before the action that the electronic device consecutively acquires the multiple face images, the method further includes the following actions. The electronic device detects an event with an unlocking requirement, and the event with the unlocking requirement may be triggered by a touch operation, pressing operation, voice operation and the like of the user. For example, for the electronic device in a screenoff standby state, a power button or a Home button is pressed to trigger the event with the unlocking requirement. A triggering condition is not limited herein.

At block S202, the electronic device determines a second focal length range according to definitions of the multiple face images.

In a possible example, the action that the second focal length range is determined according to the definitions of the multiple face images includes the following actions.

Whether a region of which a definition is higher than a second preset threshold value exists in each of the multiple face images is judged.

When it is determined that the region of which the definition is higher than the preset threshold value exists in at least one of the multiple face images, a focal length corresponding to the at least one face image is acquired.

The second focal length range is determined according to the acquired focal length.

The region of which the definition is higher than the second preset threshold value may be an eye region, may also be a nose region, and may further be an ear region and the like.

The second focal length range according to the focal length may be determined in a sequence from a focal length minimum value to focal length maximum value in the at least one face image.

The second focal length range is smaller than the first focal length range.

A face of the real user is a 3D face, so that a photographic device may shoot part of regions of the face with higher definitions in multiple focus planes.

Figure 2B:
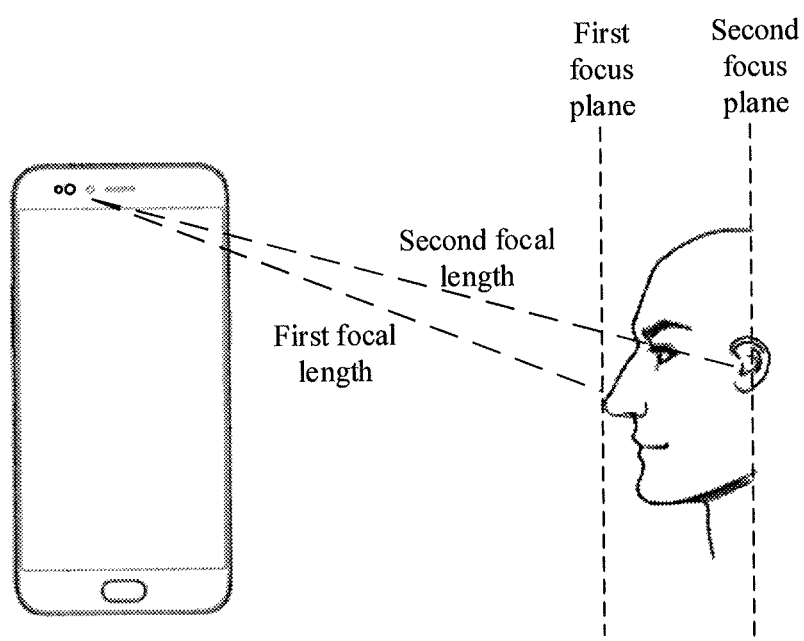
FIG. 2B illustrates an example diagram of 3D face image focus planes according to an embodiment of the disclosure.

For example, as illustrated in FIG. 2B, when a camera device takes a first focus plane where the nose is located as a focusing point and the focal length is a first focal length, a definition of the nose is higher. When a second focus plane where the nose is located is taken as the focusing point and the focal length is a second focal length, a definition of an ear is higher. That is, due to the 3D face, there may exist part of regions of the face with higher definitions in the second focal length range from the first focal length to the second focal length for the face. However, under the condition of a Two-Dimensional (2D) face in a photo, all parts of the face are located on the same plane. When a focus plane changes, that is, the focal length changes, there may exist the condition that the definition of the face is suddenly increased or decreased. Therefore, the second focal length range of the 2D face in the photo is only a very small range.

It can be seen that, in the example, the electronic device determines the second focal length range according to whether there exist regions with higher definitions on the face under different focal lengths in a focusing process, and no additional operation is required. Therefore improvement of real face detection intelligence and convenience of the electronic device is facilitated.

At block S203, the electronic device determines that a face is a real face according to the second focal length range.

In a possible example, the action that it is determined that the face is the real face according to the second focal length range includes the following actions.

The second focal length range is larger than a preset range is judged.

When it is determined that the second focal length range is larger than or equal to the preset range, it is determined that the face is the real face.

Since part of regions of the face with higher definitions may be shot in multiple focus planes for the 3D face of the real user but the 2D face in the photo is a plane, the second focal length range of the real face is larger and the second focal length range of the 2D face in the photo is smaller. Therefore, when it is determined that the second focal length range is larger than or equal to the preset range, it is determined that the face is the real face. When it is determined that the second focal length range is smaller than the preset range, it is determined that the face is the face in the photo.

It can be seen that, in the example, the electronic device determines the real face and the face in the photo according to magnitudes of the determined second focal length range and a preset threshold value, and a judgment process is convenient, so that the real face detection convenience of the electronic device is further improved.

It can be seen that, in the embodiment of the disclosure, the electronic device consecutively acquires the multiple face images at first when the focal length is consecutively changed in the first focal length range. Then the electronic device determines the second focal length range according to the definitions of the multiple face images and finally determines that a user is a real user according to the second focal length range. Apparently, the electronic device determines the second focal length range capable of making a face image sharp according to the definitions of the multiple face images acquired under different focal lengths and determines that the face is not an unreal face such as a photo but a real 3D face according to the second focal length range. Therefore, improvement of security of the electronic device is facilitated. Moreover, the real face may be judged only by acquiring the face images, and no additional hardware for cooperation is required, so that improvement of detection convenience is facilitated.

It can be understood that, before the multiple face images are consecutively acquired when the focal length is consecutively changed in the first focal length range, various specific implementation manners for determining the first focal length range may be adopted and will not be limited to one in the embodiment of the disclosure.

For example, before the action that the multiple face images are consecutively acquired when the focal length is consecutively changed in the first focal length range, the method further includes the following actions.

A distance parameter value between the face and a display screen is determined.

Looking up is performed in mapping relationships between distance parameter values and focal length ranges according to the distance parameter value. The first focal length range corresponding to the distance parameter value is determined.

The electronic device includes a distance sensor or an infrared sensor and may detect the distance parameter value between the face and the display screen.

The first focal length range is a larger predicted focal length range capable of making the face images sharp.

It can be seen that, in the example, the electronic device pre-stores the mapping relationships between the distance parameter value and the focal length range. After detecting the distance parameter value between the face and the display screen, acquires the first focal length range by querying. Therefore, the method is convenient, and increase of a speed of the electronic device in determining the first focal length range is facilitated.

For another example, before the multiple face images are consecutively acquired when the focal length is consecutively changed in the first focal length range, the method further includes the following actions.

The distance parameter value between the face and the display screen is determined.

A reference focus is determined according to the distance parameter value.

A reference face image is acquired according to the reference focus.

When it is detected that a definition of the reference face image is higher than a first preset threshold value, the first focal length range is determined according to the reference focus and a preset range.

The reference focus is a focus which is determined and predicted according to the distance parameter value and may make a definition of a face image higher. A specific implementation manner for the reference focus may be determination according to pre-stored mapping relationships between distance parameter values and focuses and may also be determination according to historical data of the electronic device, which is not limited herein.

The action that the first focal length range is determined according to the reference focus and the preset range may be implemented that the preset range taking the focus as a center value is determined as the first focal length range.

It can be seen that, in the example, the electronic device determines the reference focus according to the distance parameter value between the face and the display screen. The electronic device acquires the reference face image at a position of the reference focus and determines a more accurate first focal length range according to the definition of the reference image. Therefore, improvement of accuracy of the first focal length range determined by the electronic device is facilitated.

In a possible example, after the action that it is determined that the face is the real face according to the second focal length range, the method further includes the following actions.

The electronic device acquires a biological image according to a preset strategy.

The electronic device matches the biological image with a preset biological template.

When the biological image is successfully matched with the preset biological template, an unlocking operation is executed.

The biological image may be one or more of a fingerprint image, a face image or an iris image.

The preset strategy may be acquiring different biological images according to different applications and may also be acquiring different biological images according to security levels of different events with the unlocking requirement and the like, which is not limited herein.

When the biological image is a face image, if the definition of the reference face image is higher than the first preset threshold value, the face image may be the reference face image, face data is generated by a process of face characteristic point extraction and the like, and the face data is matched with a preset face template.

When the biological image is an iris image, the electronic device, after acquiring the iris image, executes iris image quality assessment, iris region positioning (including rough positioning and fine positioning), iris preprocessing and iris characteristic point extraction for the iris image to generate iris data, and matches the iris data with a preset iris template.

An implementation manner of the unlocking operation executed by the electronic device may be switching the electronic device from a present state to an unlocked state. The present state includes a screen-locked state, a disabled state and the like, which is not specifically limited herein.

The preset biological template is template data generated by a fingerprint or iris or face image input by the user in advance.

It can be seen that, in the example, the electronic device, after determining that the face is the real face, matches biological information of the user with the preset biological template through the preset strategy and executes the unlocking operation. Therefore, improvement of integrity of the unlocking operation of the electronic device is facilitated, and security of the electronic device is further improved.

Figure 3:
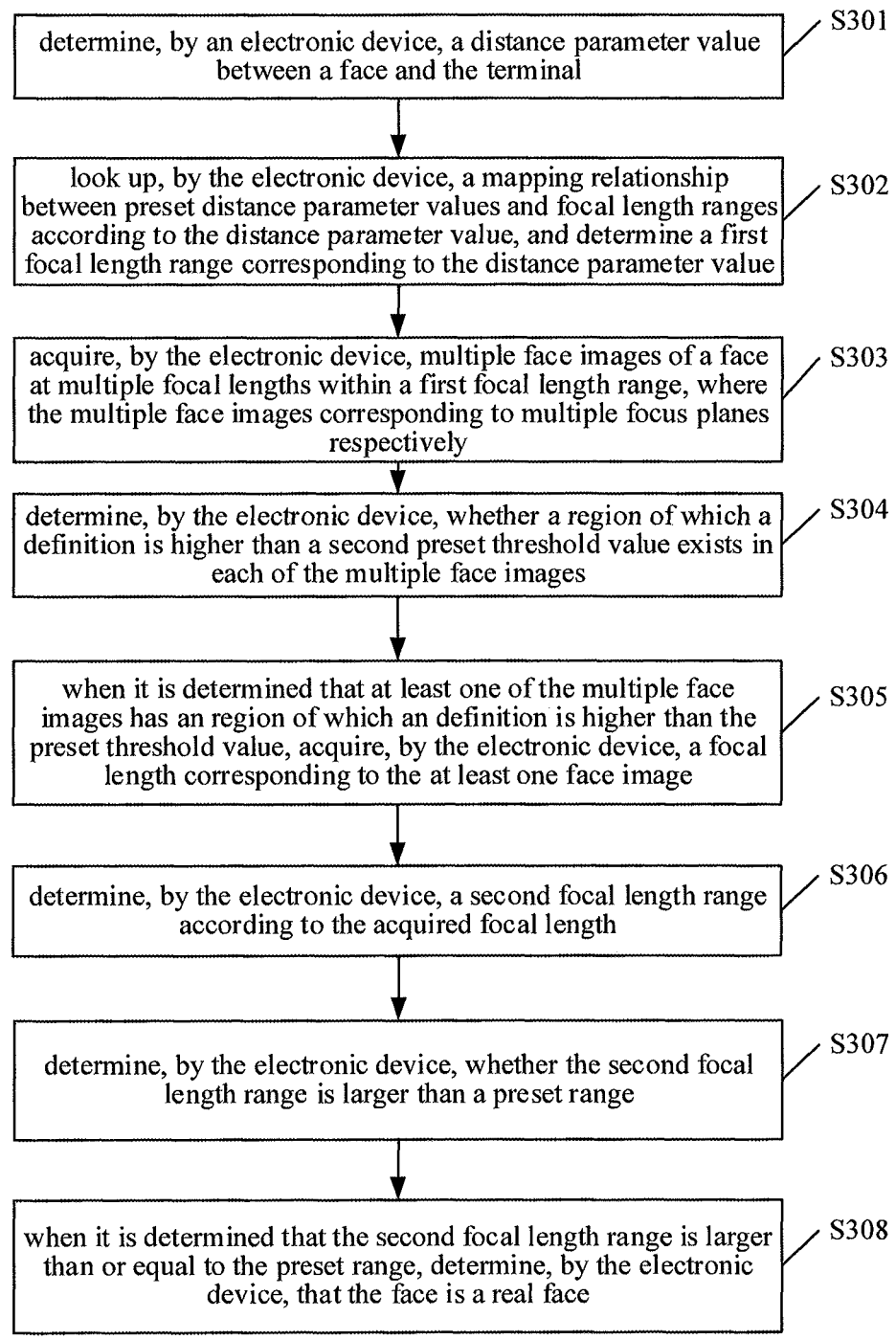
FIG. 3 illustrates a flowchart of another method according to an embodiment of the disclosure.

Consistently with the embodiment illustrated in FIG. 2A, FIG. 3 is a flowchart of a method according to an embodiment of the disclosure. The method is applied to an electronic device, and as illustrated in the figure, includes the following actions illustrated in blocks. The method may start at block S301.

At block S301, the electronic device determines a distance parameter value between a face and a display screen.

At block S302, the electronic device looks up a mapping relationship between preset distance parameter values and focal length ranges according to the distance parameter value, to determine a first focal length range corresponding to the distance parameter value.

At block S303, when a focal length is consecutively changed in the first focal length range, the electronic device consecutively acquires multiple face images.

At block S304, the electronic device judges whether a region of which a definition is higher than a second preset threshold value exists in each of the multiple face images.

At block S305, when it is determined that the region of which the definition is higher than the preset threshold value exists in at least one of the multiple face images, the electronic device acquires a focal length corresponding to the at least one face image.

At block S306, the electronic device determines a second focal length range according to the acquired focal length.

At block S307, the electronic device judges whether the second focal length range is larger than a preset range.

At block S308, when it is determined that the second focal length range is larger than or equal to the preset range, the electronic device determines that the face is a real face.

It can be seen that, in the embodiment of the disclosure, the electronic device consecutively acquires the multiple face images at first when the focal length is consecutively changed in the first focal length range. Then the electronic device determines the second focal length range according to the definitions of the multiple face images and finally determines that a user is a real user according to the second focal length range. Apparently, the electronic device determines the second focal length range capable of making a face image sharp according to the definitions of the multiple face images acquired under different focal lengths. The electronic device further determines that the face is not an unreal face such as a photo but a real 3D face according to the second focal length range. Thus, improvement of security of the electronic device is facilitated. Moreover, the real face may be judged only by acquiring the face images, and no additional hardware for cooperation is required, so that improvement of detection convenience is facilitated.

In addition, the electronic device pre-stores the mapping relationships between the distance parameter values and the focal length ranges. After detecting the distance parameter value between the face and the display screen, the electronic device acquires the first focal length range by querying. Therefore, the method is convenient, and increase of a speed of the electronic device in determining the first focal length range is facilitated. Moreover, the second focal length range is determined according to whether there exist regions with higher definitions on the face under different focal lengths in a focusing process, and no additional operation is required. Therefore, improvement of real face detection intelligence and convenience of the electronic device is facilitated.

Figure 4:
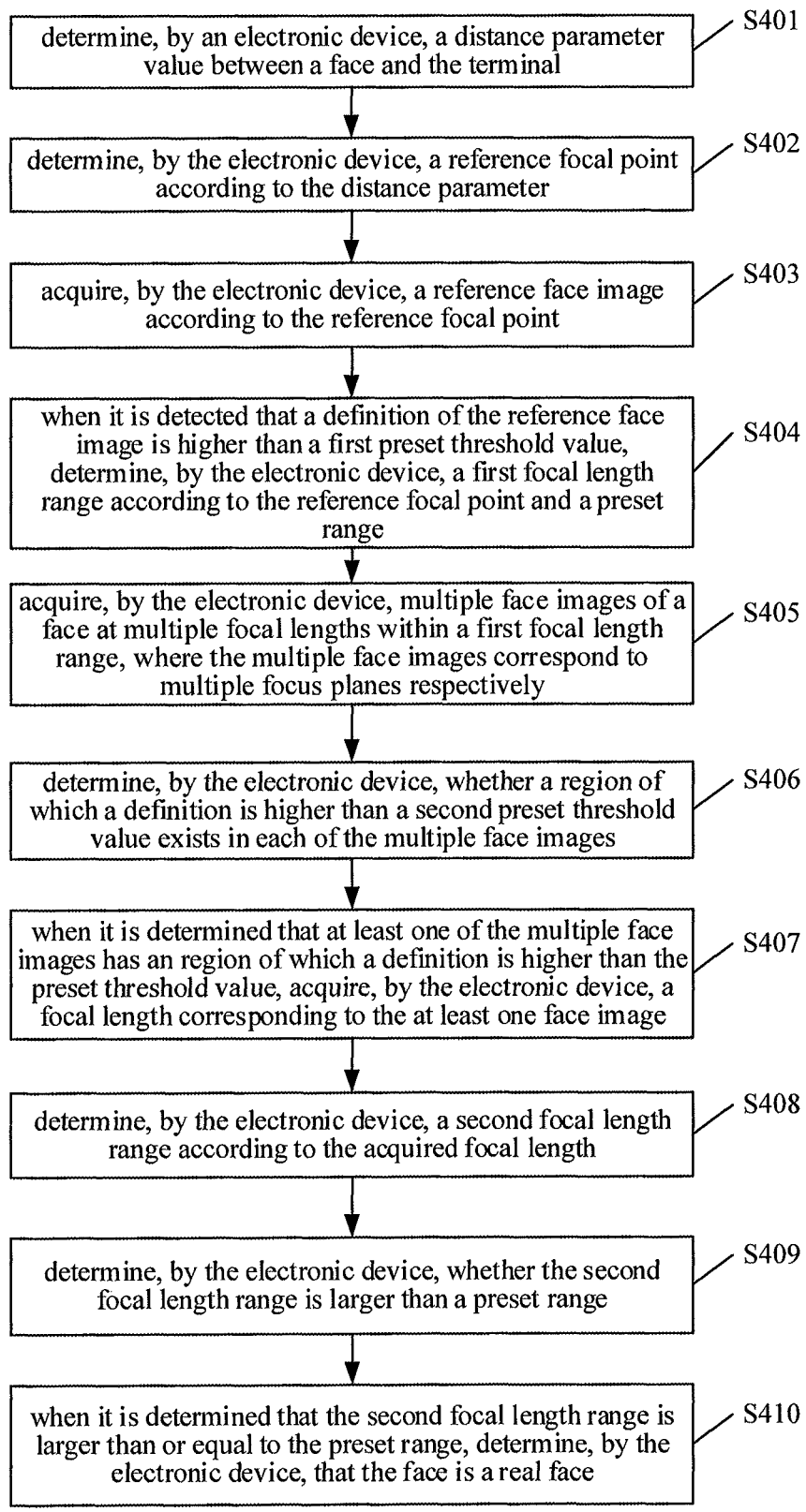
FIG. 4 illustrates a flowchart of another method according to an embodiment of the disclosure.
Figure 5:
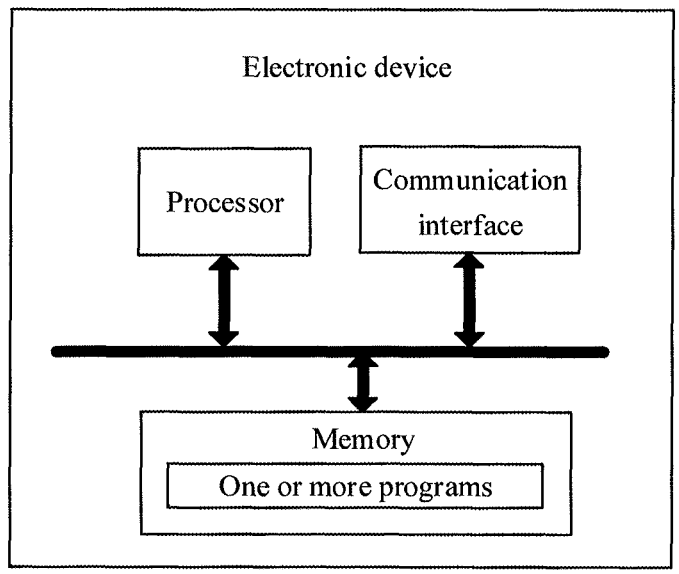
FIG. 5 illustrates a structure diagram of an electronic device according to an embodiment of the disclosure.

Consistently with the embodiment illustrated in FIG. 2A, FIG. 4 is a flowchart of a method according to an embodiment of the disclosure. The method is applied to an electronic device, and as illustrated in the figure, includes the following actions illustrated in blocks. The method may start at block S401.

At block S401, the electronic device determines a distance parameter value between a face and a display screen.

At block S402, the electronic device determines a reference focus according to the distance parameter value.

At block S403, the electronic device acquires a reference face image according to the reference focus.

At block S404, when it is determined that a definition of the reference face image is higher than a first preset threshold value, the electronic device determines a first focal length range according to the reference focus and a preset range.

At block S405, when a focal length is consecutively changed in the first focal length range, the electronic device consecutively acquires multiple face images.

At block S406, the electronic device judges whether a region of which a definition is higher than a second preset threshold value exists in each of the multiple face images.

At block S407, when it is determined that the region of which the definition is higher than the preset threshold value exists in at least one of the multiple face images, the electronic device acquires a focal length corresponding to the at least one face image.

At block S408, the electronic device determines a second focal length range according to the acquired focal length.

At block S409, the electronic device judges whether the second focal length range is larger than a preset range.

At block S410, when it is determined that the second focal length range is larger than or equal to the preset range, the electronic device determines that the face is a real face.

It can be seen that, in the embodiment of the disclosure, the electronic device consecutively acquires the multiple face images at first when the focal length is consecutively changed in the first focal length range. Then the electronic device determines the second focal length range according to the definitions of the multiple face images and finally determines that a user is a real user according to the second focal length range. Apparently, the electronic device determines the second focal length range capable of making a face image sharp according to the definitions of the multiple face images acquired under different focal lengths and determines that the face is not an unreal face such as a photo but a real 3D face according to the second focal length range, so that improvement of security of the electronic device is facilitated. Moreover, the real face may be judged only by acquiring the face images, and no additional hardware for cooperation is required, so that improvement of detection convenience is facilitated.

In addition, the electronic device determines the reference focus according to the distance parameter value between the face and the display screen, acquires the reference face image at a position of the reference focus and determines a more accurate first focal length range according to the definition of the reference image, so that improvement of accuracy of the first focal length range determined by the electronic device is facilitated.

Consistently with the embodiments illustrated in FIGS. 2A, 3 and 4, FIG. 5 is a structure diagram of an electronic device according to an embodiment of the disclosure. As illustrated in the figure, the electronic device includes a processor, a memory, a communication interface and one or more programs. The one or more programs are stored in the memory, and are configured to be executed by the processor. The programs include instructions configured to execute the following actions.

When a focal length is consecutively changed in a first focal length range, consecutively acquiring multiple face images.

A second focal length range is determined according to definitions of the multiple face images.

A face is determined to be a real face according to the second focal length range.

It can be seen that, in the embodiment of the disclosure, the electronic device consecutively acquires the multiple face images at first when the focal length is consecutively changed in the first focal length range. Then the electronic device determines the second focal length range according to the definitions of the multiple face images and finally determines that a user is a real user according to the second focal length range. Apparently, the electronic device determines the second focal length range capable of making a face image sharp according to the definitions of the multiple face images acquired under different focal lengths. The electronic device determines that the face is not an unreal face such as a photo but a real 3D face according to the second focal length range. Therefore, improvement of security of the electronic device is facilitated. Moreover, the real face may be judged only by acquiring the face images, and no additional hardware for cooperation is required, so that improvement of detection convenience is facilitated.

In a possible example, the programs further include instructions configured to execute the following actions. Before consecutively acquiring the multiple face images when the focal length is consecutively changed in the first focal length range, a distance parameter value between the face and a display screen is determined. A mapping relationship between preset distance parameter values and focal length ranges is looked up according to the distance parameter value, to determine the first focal length range corresponding to the distance parameter value.

In a possible example, the programs further include instructions configured to execute the following actions. Before consecutively acquiring the multiple face images when the focal length is consecutively changed in the first focal length range, the distance parameter value between the face and the display screen is determined. A reference focus is determined according to the distance parameter value. A reference face image is acquired according to the reference focus. When it is determined that a definition of the reference face image is higher than a first preset threshold value, the first focal length range is determined according to the reference focus and a preset range.

In a possible example, in terms of determination about the second focal length range according to the definitions of the multiple face images, the instructions in the programs are specifically configured to execute judging whether a region of which a definition is higher than a second preset threshold value exists in each of the multiple face images. The instructions are configured to, when it is determined that the region of which the definition is higher than the preset threshold value exists in at least one of the multiple face images, acquire a focal length corresponding to the at least one face image. The instructions are configured to determine the second focal length range according to the acquired focal length.

In a possible example, in terms of determination about that the face is the real face according to the second focal length range, the instructions in the programs are specifically configured to judge whether the second focal length range is larger than a preset range. The instructions are configured to, when it is determined that the second focal length range is larger than or equal to the preset range, determine that the face is the real face.

The solutions of the embodiments of the disclosure are mainly introduced above from the angle of an execution process on a method side. It can be understood that the electronic device, for realizing the functions, includes a corresponding hardware structure and/or software module executing each function. Those skilled in the art may easily realize that the units or algorithm actions of each example described in combination with the embodiments disclosed in the disclosure may be implemented in form of hardware or a combination of the hardware and computer software in the disclosure. Whether a certain function is executed in a manner of hardware or driving the hardware by computer software depends on specific applications and design constraints of the technical solutions. Professionals may realize the described functions for each specific application by virtue of different methods, but such realization shall fall within the scope of the disclosure.

Function units of the electronic device may be divided according to the abovementioned method examples in the embodiment of the disclosure. For example, each function unit corresponding to each function may be divided, and two or more than two functions may also be integrated into a processing unit. The integrated unit may be implemented in form of hardware and may also be implemented in form of software function unit. It is important to note that division of the units in the embodiment of the disclosure is only schematic and is only logic function division, and another division manner may be adopted during practical implementation.

Figure 6:
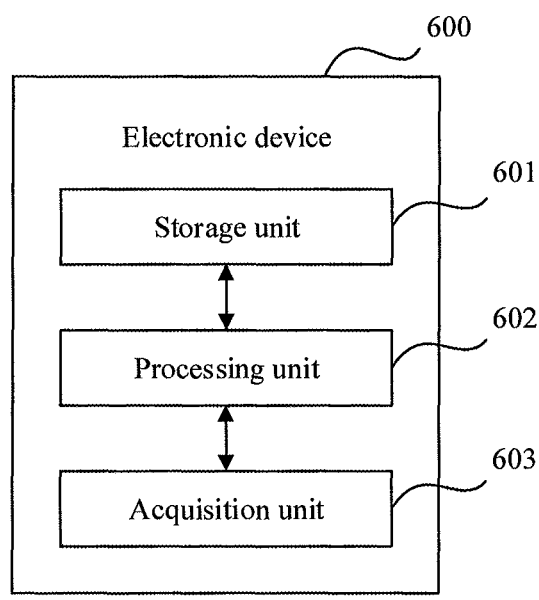
FIG. 6 illustrates a composition block diagram of function units of an electronic device according to an embodiment of the disclosure.

Under the condition of adopting integrated units, FIG. 6 is a possible composition block diagram of function units of the electronic device involved in the embodiment. The electronic device 600 includes: a processing unit 602 and an acquisition unit 603. The processing unit 602 is configured to perform control and management on actions of the electronic device. For example, the processing unit 602 is configured to support the electronic device to execute actions S201-S203 in FIG. 2A, actions S301-S308 in FIG. 3 and actions S401-S410 in FIG. 4 and/or is configured for other processes of a technology described in the disclosure. The acquisition unit 603 is configured to support communication between the electronic device and other equipment. The electronic device may further include a storage unit 601, configured to store a program code and data of the electronic device.

The acquisition unit 603 is configured to, when a focal length is consecutively changed in a first focal length distance, consecutively acquire multiple face images.

The processing unit 602 is configured to determine a second focal length range according to definitions of the multiple face images.

The processing unit 602 is further configured to determine that a face is a real face according to the second focal length range.

In a possible example, before the acquisition unit 603 consecutively acquires the multiple face images when the focal length is consecutively changed in the first focal length range, the processing unit 602 is further configured to determine a distance parameter value between the face and the display screen. The processing unit 602 is further configured to look up a mapping relationship between preset distance parameter values and focal length ranges according to the distance parameter value, to determine the first focal length range corresponding to the distance parameter value.

In a possible example, before the acquisition unit 603 consecutively acquires the multiple face images when the focal length is consecutively changed in the first focal length range, the processing unit 602 is further configured to determine the distance parameter value between the face and the display screen. The processing unit 602 is configured to determine a reference focus according to the distance parameter value. The processing unit 602 is configured to acquire a reference face image according to the reference focus. The processing unit 602 is configured to, when it is determined that a definition of the reference face image is higher than a first preset threshold value, determine the first focal length range according to the reference focus and a preset range.

In a possible example, in terms of determination about the second focal length range according to the definitions of the multiple face images, the processing unit 602 is specifically configured to judge whether a region of which a definition is higher than a second preset threshold value exists in each of the multiple face images. The processing unit 602 is configured to, when it is determined that the region of which the definition is higher than the preset threshold value exists in at least one of the multiple face images, acquire a focal length corresponding to the at least one face image. The processing unit 602 is further configured to determine the second focal length range according to the acquired focal length.

In a possible example, in terms of determination about that the face is the real face according to the second focal length range, the processing unit 602 is specifically configured to judge whether the second focal length range is larger than a preset range. The processing unit 602 is further configured to, when it is determined that the second focal length range is larger than or equal to the preset range, determine that the face is the real face.

Where, the processing unit 602 may be a processor or a controller, the acquisition unit 603 may be an iris image acquisition device or a face image acquisition device, and the storage unit 601 may be a memory.

An embodiment of the disclosure further provides a computer storage medium, where the computer storage medium stores a computer program configured for electronic data exchange, the computer program enables a computer to execute part or all of actions of any method recorded in the abovementioned method embodiments, and the computer includes an electronic device.

An embodiment of the disclosure further provides a computer program product, the computer program product includes a non-transitory computer-readable storage medium storing a computer program, and the computer program may be operated to enable a computer to execute part or all of actions of any method recorded in the abovementioned method embodiments. The computer program product may be a software installation packet, and the computer includes an electronic device.

It is important to note that, for simple description, each method embodiment is expressed as a combination of a series of actions. However, those skilled in the art should know that the disclosure is not limited to a described action sequence, and this is because, according to the disclosure, some actions may be executed in another sequence or at the same time. Second, those skilled in the art should also know that all of the embodiments described in the specification belong to some embodiments and involved actions and modules are not always necessary to the disclosure.

In the embodiments, each embodiment is described with different emphases and parts which are not elaborated in a certain embodiment maybe seen from related descriptions in the other embodiments.

In some embodiments provided by the application, it should be understood that the disclosed device may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also physically exist independently, and two or more than two units may also be integrated into a unit. The integrated unit may be implemented in form of hardware and may also be implemented in form of software function unit.

When being implemented in form of software function unit and sold or used as an independent product, the unit may be stored in a computer-readable storage medium. Based on such an understanding, the technical solutions of the disclosure substantially or parts making contributions to the conventional art or all or part of the technical solutions may be embodied in form of software product, and the computer software product is stored in a memory, including a plurality of instructions configured to enable a piece of computer equipment (which may be a personal computer, a server, network equipment or the like) to execute all or part of the actions of the method in each embodiment of the disclosure. The memory includes: various media capable of storing program codes such as a U disk, a Read-Only Memory (ROM), a Random Access Memory (RAM), a mobile hard disk, a magnetic disk or an optical disk.

Those of ordinary skilled in the art should know that all or part of the actions in various methods of the embodiments may be implemented by related hardware instructed by a program, the program may be stored in a computer-readable memory, and the memory may include: a flash disk, a ROM, a RAM, a magnetic disk, an optical disk or the like.

The embodiments of the disclosure are introduced above in detail. The principle and implementation mode of the disclosure are elaborated with specific examples in the disclosure. The above descriptions about the embodiments are only intended to help the method of the disclosure and the core concept thereof to be understood. In addition, those of ordinary skilled in the art may make changes to the specific implementation mode and the application range according to the concept of the disclosure. From the above, the contents of the specification should not be understood as limits to the disclosure.

The invention claimed is:

1. An electronic device for recognizing a real face, comprising:
   a face image acquisition device, configured to acquire a plurality of face images of a face at a plurality of focal lengths within a first focal length range, wherein the plurality of face images correspond to a plurality of focus planes respectively; and
   a processor, connected to the face image acquisition device and configured to:
      determine at least one face images with a higher definition out of the plurality of the face images,
      form a second focal length range with focal lengths of the at least one face images, and
      determine that the face is a real face according to the second focal length range;
   wherein the processor is further configured to:
      determine a distance parameter value between the face and a display screen;
      determine a reference focus according to the distance parameter value;
      acquire a reference face image according to the reference focus; and
      when it is detected that a definition of the reference face image is higher than a first preset threshold value, determine the first focal length range according to the reference focus and a preset range.

2. The electronic device according to claim 1, wherein the processor is further configured to:
   determine a distance parameter value between the face and a display screen, and,
   look up a mapping relationship between preset distance parameter values and focal length ranges according to the distance parameter value, to determine the first focal length range corresponding to the distance parameter value.

3. The electronic device according to claim 1, wherein the processor is further configured to:
   determine whether a region of which a definition is higher than a second preset threshold value exists in each of the plurality of face images;
   when it is determined that at least one of the plurality of face images has an region of which an definition is higher than the second preset threshold value; acquire a focal length corresponding to the at least one face image; and
   determine the second focal length range according to the acquired focal length.

4. The electronic device according to claim 2, wherein, the processor is further configured to:
   determine whether a region of which a definition is higher than a second preset threshold value exists in each of the plurality of face images;
   when it is determined that at least one of the plurality of face images has an region of which an definition is higher than the second preset threshold value; acquire a focal length corresponding to the at least one face image; and
   determine the second focal length range according to the acquired focal length.

5. The electronic device according to claim 1, wherein, the processor is further configured to:

determine whether a region of which a definition is higher than a second preset threshold value exists in each of the plurality of face images;

when it is determined that at least one of the plurality of face images has an region of which an definition is higher than the second preset threshold value; acquire a focal length corresponding to the at least one face image; and determine the second focal length range according to the acquired focal length.

6. The electronic device according to claim 1, wherein, the processor is further configured to:

determine whether the second focal length range is larger than a preset range; and when it is determined that the second focal length range is larger than or equal to the preset range, determine that the face is the real face.

7. A method for recognizing a real face, comprising:

acquiring, by an electronic device, a plurality of face images of a face at a plurality of focal lengths within a first focal length range, wherein the plurality of face images correspond to a plurality of focus planes respectively;

determining, by the electronic device, at least one face images with a higher definition out of the plurality of the face images, and forming a second focal length range with focal lengths of the at least one face images; and determining, by the electronic device, that the face is a real face according to the second focal length range;

wherein the method further comprises:

determining the distance parameter value between the face and the electronic device;

determining a reference focus according to the distance parameter value;

acquiring a reference face image according to the reference focus; and when it is detected that a definition of the reference face image is higher than a first preset threshold value, determining the first focal length range according to the reference focus and a preset range.

8. The method according to claim 7, wherein the method further comprises:

determining a distance parameter value between the face and the electronic device and looking up a mapping relationship between preset distance parameter values and focal length ranges according to the distance parameter value, to determine the first focal length range corresponding to the distance parameter value.

9. The method according to claim 7, wherein determining, by the electronic device, at least one face images with a higher definition out of the plurality of the face images, and forming a second focal length range with focal lengths of the at least one face images, comprises:

determining whether a region of which a definition is higher than a second preset threshold value exists in each of the plurality of face images;

when it is determined that at least one of the plurality of face images has an region of which an definition is higher than the second preset threshold value, acquiring a focal length corresponding to the at least one face image; and determining the second focal length range according to the acquired focal length.

10. The method according to claim 8, wherein determining, by the electronic device, at least one face images with a higher definition out of the plurality of the face images, and forming a second focal length range with focal lengths of the at least one face images, comprises:

determining whether a region of which a definition is higher than a second preset threshold value exists in each of the plurality of face images;

when it is determined that at least one of the plurality of face images has an region of which an definition is higher than the second preset threshold value, acquiring a focal length corresponding to the at least one face image; and determining the second focal length range according to the acquired focal length.

11. The method according to claim 7, wherein determining, by the electronic device, at least one face images with a higher definition out of the plurality of the face images, and forming a second focal length range with focal lengths of the at least one face images, comprises:

determining whether a region of which a definition is higher than a second preset threshold value exists in each of the plurality of face images;

when it is determined that at least one of the plurality of face images has an region of which an definition is higher than the second preset threshold value, acquiring a focal length corresponding to the at least one face image; and determining the second focal length range according to the acquired focal length.

12. The method according to claim 7, wherein determining that the face is the real face according to the second focal length range comprises:

determining whether the second focal length range is larger than a preset range; and when it is determined that the second focal length range is larger than or equal to the preset range, determining that the face is the real face.

13. A non-transitory computer-readable storage medium, storing a computer program, which, when executed by a processor, causes the processor to implement a method comprising the following actions:

acquiring a plurality of face images of a face at a plurality of focal lengths within a first focal length range, wherein the plurality of face images correspond to a plurality of focus planes respectively;

determining at least one face images with a higher definition out of the plurality of the face images, and forming a second focal length range with focal lengths of the at least one face images; and determining that the face is a real face according to the second focal length range;

wherein the method further comprises:

determining the distance parameter value between the face and the electronic device;

determining a reference focus according to the distance parameter value;

acquiring a reference face image according to the reference focus; and when it is detected that an overall definition of the reference face image is higher than a first preset threshold value, determining the first focal length range according to the reference focus and a preset range.

14. The non-transitory computer-readable storage medium according to claim 13, wherein the method further comprises:

determining a distance parameter value between the face and the electronic device; and looking up a mapping relationship between preset distance parameter values and focal length ranges according to the distance parameter value, to determine the first focal length range corresponding to the distance parameter value.

15. The non-transitory computer-readable storage medium according to claim 13, wherein determining, by the electronic device, at least one face images with a higher definition out of the plurality of the face images, and forming a second focal length range with focal lengths of the at least one face images, comprises:
   determining whether a region of which a definition is higher than a second preset threshold value exists in each of the plurality of face images;
   when it is determined that at least one of the plurality of face images has an region of which an definition is higher than the second preset threshold value, acquiring a focal length corresponding to the at least one face image; and
   determining the second focal length range according to the acquired focal length.

16. The non-transitory computer-readable storage medium according to claim 14, wherein determining, by the electronic device, at least one face images with a higher definition out of the plurality of the face images, and forming a second focal length range with focal lengths of the at least one face images, comprises:
   determining whether a region of which a definition is higher than a second preset threshold value exists in each of the plurality of face images;
   when it is determined that at least one of the plurality of face images has an region of which an definition is higher than the second preset threshold value, acquiring a focal length corresponding to the at least one face image; and
   determining the second focal length range according to the acquired focal length.

17. The non-transitory computer-readable storage medium according to claim 13, wherein determining that the face is the real face according to the second focal length range comprises:
   determining whether the second focal length range is larger than a preset range; and
   when it is determined that the second focal length range is larger than or equal to the preset range, determining that the face is the real face.

\* \* \* \* \*